US006704254B1

(12) United States Patent
Nishiwaki et al.

(10) Patent No.: US 6,704,254 B1
(45) Date of Patent: Mar. 9, 2004

(54) OPTICAL DISK DEVICE, CONTROL METHOD OF OPTICAL SYSTEM, MEDIUM, AND INFORMATION AGGREGATE

(75) Inventors: Seiji Nishiwaki, Osaka (JP); Kazuo Momoo, Hirakata (JP); Junji Nagaoka, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 338 days.

(21) Appl. No.: 09/698,904

(22) Filed: Oct. 27, 2000

(30) Foreign Application Priority Data

Oct. 28, 1999 (JP) .......................................... 11-307707

(51) Int. Cl.[7] ................................................ G11B 7/00

(52) U.S. Cl. ................................ 369/44.11; 369/44.32; 369/53.19

(58) Field of Search ........................... 369/44.11, 44.32, 369/53.21, 44.26, 44.27, 53.19, 44.13, 44.34, 53.15, 53.33, 53.36, 44.41

(56) References Cited

U.S. PATENT DOCUMENTS 5,646,919 A * 7/1997 Eastman et al. ......... 369/44.26
5,970,035 A * 10/1999 Ohmori et al. ............ 369/53.2
5,978,332 A * 11/1999 Itakura et al. ........... 369/44.32
6,167,009 A * 12/2000 Nakamura et al. ....... 369/44.32

OTHER PUBLICATIONS

Joint International Symposium on Optical Memory and Optical Data Storage 1999, S. Yamada et al. "Track Center Servo and Radial Tilt Servo System For DVD–RAM Disc", Tech. Digest (1999), pp. 17–19.

* cited by examiner

*Primary Examiner*—William Korzuch
*Assistant Examiner*—Kim-Kwok Chu
(74) *Attorney, Agent, or Firm*—RatnerPrestia

(57) ABSTRACT

This optical disk device includes an objective lens (7) for condensing radiated light from a light source on an optical disk (8), an optical detecting unit for detecting reflected light from the optical disk (8), and a control unit for performing the tracking control and/or the tilt control of the objective lens (7) by utilizing the output from the optical detecting unit, in which the control unit uses the off-track quantity and/or the tilt quantity of the objective lens (7) when performing the above described control.

22 Claims, 8 Drawing Sheets

OPTICAL DISK DEVICE, CONTROL METHOD OF OPTICAL SYSTEM, MEDIUM, AND INFORMATION AGGREGATE

BACKGROUND OF THE INVENTION

1. Field of the Invention

The present invention relates, for example, to an optical disk device used for recording a signal in an optical disk or for reproducing a signal of an optical disk, a control method of an optical system, a medium, and an information aggregate.

2. Description of the Related Art

The configuration and action of a conventional optical disk device will be described on the basis of FIG. 1(A) to FIG. 1(C) and FIGS. 2, 7. FIG. 1(A), FIG. 1(B), and FIG. 1(C) are a cross-sectional configuration figure of a conventional optical head, a typical figure of optical detecting means 9, and a partial enlarged view showing grooves and pits formed on an optical disk signal surface and the position of an optical spot, respectively. Herein, the position of a pit 14*c* in FIG. 1(C) is on the inner peripheral side of an optical disk 8 from the positions of pits 14*a*, 14*b*.

In FIG. 1(A), light 2 emitted from a radiating light source 1 such as a semiconductor laser penetrates a beam splitter 3, and is converted into parallel light 5 by a collimate lens 4. This light 5 is reflected on a reflecting mirror 6 and is condensed on a signal surface 8S formed on the rear surface of an optical disk 8 by an objective lens 7. In the objective lens 7, the focusing and tracking, and the tilt in the radial direction are controlled by an actuator. The light reflected on the signal surface 8S is condensed by the objective lens 7 and reflected on the reflecting mirror 6, and passing through the collimate lens 4, it is reflected on the beam splitter 3, and becomes light 10 to be condensed on optical detecting means 9.

The optical detecting means 9 is divided by a dividing line 9L corresponding to the rotational direction (direction Y at right angles to the paper surface of FIG. 1(A)) of the optical disk 8, and as shown in FIG. 1(B), this dividing line 9L approximately equally divides an optical spot 10S on the optical detecting means into two, and each difference signal 10S is detected by a subtracter 10, and a summation signal 11S is detected by an adder 11.

As shown in FIG. 1(C), on the signal surface 8S of the optical disk, uneven groves 13G and inter-groove spaces 13L, pit lines 14*a* and pit lines 14*b* with a fixed length are formed in cycles at a pitch p in the radial direction 12 of the optical disk 8. On the groove 13G and inter-groove space 13L, signal marks 15 having a reflection factor different from that out of the own area are formed, and the difference of those reflection factors is read as a reproduction signal by an optical spot 16 scanning along the groove and inter-groove space. The positions of the pit lines 14*a*, 14*b* are in synchronization with each other in the adjacent tracks, and they are also in cycles at a pitch q in the rotational direction of the optical disk. Furthermore, the center of the pit line 14*a* deviates from the center of the groove 13G by s along the radial direction, and the pit line 14*b* deviates by s in the opposite direction thereof. Accordingly, when the optical spot 16 that has been tracking-position-controlled on the groove 13G and the inter-groove space 13L scans on the pit lines 14*a*, 14*b*, each goes on a position deviating from the center of the pit by s.

On the other hand, on the inner peripheral side of the optical disk, pit lines 14*c* are formed in cycles at a pitch P' in the radial direction 12. It is possible that the positions of the pit lines 14*c* are not in synchronization with each other in the adjacent ones, and it is also possible that there is no periodicity in the rotational direction of the optical disk and the length is random. Naturally, when the tracking-position-controlled optical spot 16 scans on the pit line 14*c*, it goes on the center position of the pit.

FIG. 2 shows a signal waveform of a summation signal 11S at the time when the optical spot 16 scans near the pit lines 14*a* and 14*b*. Herein, in FIG. 2, the time-axis is shown in the horizontal axis, and it expresses the fact that the signal waveform of the pit line 14*b* is detected after the signal waveform of the pit line 14*a* has been detected. When the optical spot 16 is positioned at places 101*a*, 101*b* just beside the pits (refer to FIG. 1(c)), the scattering effect by the pit is large and the detected light quantity is lowered, but when it is positioned at places 102*a*, 102*b* just beside the inter-pit spaces (spaces between a pit and a next pit) (refer to FIG. 1(C)), the detected light quantity is restored. Accordingly, by scanning beside the pit line 14*a*, the reproduction signal vibrates between an envelope 17*a* (corresponding to the reproduction signal at the position 101*a*) and an envelope 18*a* (corresponding to the reproduction signal at the position 102*a*) (letting the output differences from a level 19 of a detected light quantity of zero to the respective envelopes be A1, A2). Similarly, by the scanning of the optical spot 16 beside the pit line 14*b*, the reproduction signal also vibrates between an envelope 17*b* (corresponding to the reproduction signal at the position 101*b*) and an envelope 18*b* (corresponding to the reproduction signal at the position 102*b*) (letting the output differences from a level 19 of a detected light quantity of zero to the respective envelopes be B1, B2).

FIG. 7 shows a flow of the control signal process in the movable tilting means of a conventional optical disk device. In FIG. 7, a summation signal 11S created in the adder 11 is a signal at the time when the optical spot 16 scans near the pit lines 14*a* and 14*b*, and it shows a signal waveform shown in FIG. 2. These signals whose detecting times are different are introduced into an arithmetic circuit 20, and the delaying process is applied, and a signal B defined by the relation of B=(A2−A1)−(B2−B1) is created, and a signal 23 in which the high frequencies are cut by a low-pass filter 22 is made.

On the other hand, a signal A of the difference created in the subtracter 10 is a signal at the time when the optical spot 16 scans on the groove 13G or the inter-groove space 13L. A difference signal 24 of this signal A and the signal 23 is introduced into a driving circuit 25, and a tracking drive signal 26 is created. By this drive signal 26, the objective lens 7 is moved in the radial direction of the optical disk 8, and according to the control formula B=0, the tracking center control of the optical spot 16 is performed.

Furthermore, under the condition where this tracking control is applied, the signal A becomes a signal 28 in which the high frequencies are cut by a low-pass filter 27 and is introduced into a driving circuit 29, and a lens tilt drive signal 30 is created. By this drive signal 30, the objective lens 7 is tilted in the radial direction of the optical disk 8 (state of the objective lens 7' in FIG. 1(A)), and according to the control formula A=0, the lens tilt control is performed.

By such a control, it has been intended to reduce the off-track quantity of the optical spot 16 and to cancel the aberration (especially, third order coma aberration) of the optical spot 16 created by the tilt of the optical disk 8 (state of the optical disk 8' in FIG. 1(A)).

However, actually, there has been such a problem that the off-track quantity cannot be made zero by a conventional method like this, and that the third order coma aberration also cannot be cancelled. Furthermore, it has been impossible to well understand the reason.

When the off-track quantity deviates from zero, there is such a problem that the optical spot 16 eliminates part of the adjacent signal mark 15 at the time of recording and that the cross-talk increases at the time of reproduction to degrade the jitter or the like. Furthermore, when the third order coma aberration cannot be cancelled, there are problems such as the power shortage at the time of recording or the degradation of the jitter at the time of reproduction.

BRIEF SUMMARY OF THE INVENTION

Considering such problems, it is an object of the present invention to provide, for example, an optical disk device in which the off-track or the third order coma aberration created by the relative tilt of the disk can be suppressed to an extremely small degree, a control method of an optical system, a program recording medium, and an information aggregate.

One aspect of the present invention is an optical disk device comprising:

- optical condensing means for condensing radiated light from a light source on an optical disk;
- optical detecting means for detecting reflected light from said optical disk; and
- control means for performing tracking control and/or tilt control of said optical condensing means by utilizing output from said optical detecting means, wherein said control means uses an off-track quantity and/or a tilt quantity of said optical condensing means, when said control is performed.

Another aspect of the present invention is an optical disk device comprising:

- a radiating light source for performing radiation of a radiated light;
- an objective lens for condensing said radiated light on a signal surface of an optical disk as an optical spot, and for condensing returning light from said optical disk;
- movable tilting means for controlling movement of said objective lens in the radial direction of said optical disk, and tilt in said radial direction of said objective lens; and
- optical detecting means for detecting a light quantity of said returning light, wherein
  - a signal A and a signal B that are detected when said optical spot scans near cyclic grooves or cyclic pits formed on a signal surface of said optical disk are compensated by using quantities $\beta \cdot LT$ and $\gamma \cdot LT$ proportional to a tilt quantity LT of said objective lens to be a compensated signal ($A-\beta \cdot LT$) and a compensated signal ($B-\gamma \cdot LT$), and letting said compensated signal ($A-\beta \cdot LT$) be a tilt control signal for controlling tilt of said objective lens, and letting said compensated signal ($B-\gamma \cdot LT$) be a tracking control signal for controlling an alignment to said cyclic grooves or said cyclic inter-groove spaces of said optical spot, said movable tilting means controls said movement of said objective lens and said tilt of said objective lens so that said tilt control signal and said tracking control signal may substantially be zero.

Still another aspect of the present invention is the optical disk device, further comprising optical distributing means for distributing said radiated light and said returning light, wherein said returning light is bent in a direction different from that on the approach route side of said radiated light by said optical distributing means and condensed on said optical detecting means.

Yet another aspect of the present invention is the optical disk device, wherein

- said cyclic grooves and said cyclic pits are formed along the radial direction of said optical disk by a pitch P, and
- in said cyclic pits, there are cyclic pits a arranged such that the positions thereof are shifted to the inner peripheral side along the radial direction from the positions of cyclic grooves by s in cycles in the rotational direction of the optical disk, and cyclic pits b arranged to be inversely shifted to the outer peripheral side by s in cycles in the rotational direction of said optical disk, and
- said optical spot scans on said cyclic grooves or on said cyclic inter-groove spaces.

Still yet another aspect of the present invention is the optical disk device, wherein a positional shift s of said cyclic pits is equal to P/4 or P/2.

A further aspect of the present invention is the optical disk device, wherein a tilt quantity LT of said objective lens is estimated by using driving current on the tilt side of said movable tilting means or driving voltage on the tilt side of said movable tilting means.

A still further aspect of the present invention is the optical disk device, wherein set values of said coefficient $\beta$ and said coefficient $\gamma$ are changed depending on whether said optical spot scans on said cyclic grooves or on said cyclic inter-groove spaces.

A still yet further aspect of the present invention is the optical disk device, wherein

- tilt to an optical axis of said objective lens converging as a result of control agrees with the tilting direction of a base plate of said optical disk, and
- a third order coma aberration component of an optical spot on said signal surface is substantially suppressed by setting of said coefficient $\beta$ with each tilt.

An additional aspect of the present invention is the optical disk device, wherein an alignment error to cyclic grooves or cyclic inter-groove spaces of said optical spot converging as a result of control is substantially suppressed by setting of said coefficient $\gamma$.

A still additional aspect of the present invention is the optical disk device, wherein

- said optical detecting means is divided into two by a straight line corresponding to the rotational direction of said optical disk, and can detect a difference signal from the divided areas, and
- either said signal A or said signal B is said difference signal at the time when said optical spot scans on said cyclic grooves or said cyclic inter-groove spaces.

A yet additional aspect of the present invention is the optical disk device, wherein

- when letting a detecting level of an envelope drawn by a side with a smaller detected light quantity be A1, and a detecting level of an envelope drawn by a side with a larger detected light quantity be A2 between detected signal waveforms by said optical detecting means when said optical spot scans near said cyclic pits a, and
- letting a detecting level of an envelope drawn by a side with a smaller detected light quantity be B1, and a detecting level of an envelope drawn by a side with a larger detected light quantity be B2 between detected signal waveforms by said optical detecting means when said optical spot scans near said cyclic pits b,
- said signal A is expressed by any one of $A=A1-B1$, $A=A2-B2$, and $A=(A2-A1)-(B2-B1)$.

A still yet additional aspect of the present invention is the optical disk device, wherein when letting a detecting level of an envelope drawn by a side with a smaller detected light quantity be A1, and a detecting level of an envelope drawn by a side with a larger detected light quantity be A2 between detected signal waveforms by said optical detecting means when said optical spot scans near said cyclic pits a, and letting a detecting level of an envelope drawn by a side with a smaller detected light quantity be B1, and a detecting level of an envelope drawn by a side with a larger detected light quantity be B2 between detected signal waveforms by said optical detecting means when said optical spot scans near said cyclic pits b, said signal B is expressed by any one of B=A1−B1, B=A2−B2, and B=(A2−A1)−(B2−B1).

A supplementary aspect of the present invention is the optical disk device, wherein said signal A is said difference signal, and a pit along the rotational direction of said optical disk is formed on the inner peripheral side of said optical disk, and said movable tilting means tilts said objective lens so that a detected signal amplitude at the time when said optical spot scans on said pit may be maximum, and moves said optical spot onto said cyclic grooves or said cyclic inter-groove spaces while keeping tilt of said objective lens, and detects an output level of said signal A when said compensated signal ($B-\gamma\cdot LT$) becomes zero, and uses a value made by subtracting an offset quantity because of an adjusting error from an output level of said detected signal A, instead of said signal A.

A still supplementary of the present invention is a control method of an optical system, comprising the steps of:

condensing radiated light from a light source on an optical information recording medium by using a given optical system;

detecting reflected light from said optical information recording medium; and performing tracking control and/or tilting control of said optical system on the basis of said detected light, wherein said control is performed by using an off-track quantity and/or a tilt quantity of said optical system.

A yet supplementary aspect of the present invention is a medium that carries a program and/or data for executing by a computer all or part of functions of all or part of means of the present invention, wherein said medium can be processed by a computer.

Description of Symbols

Figure 1A:
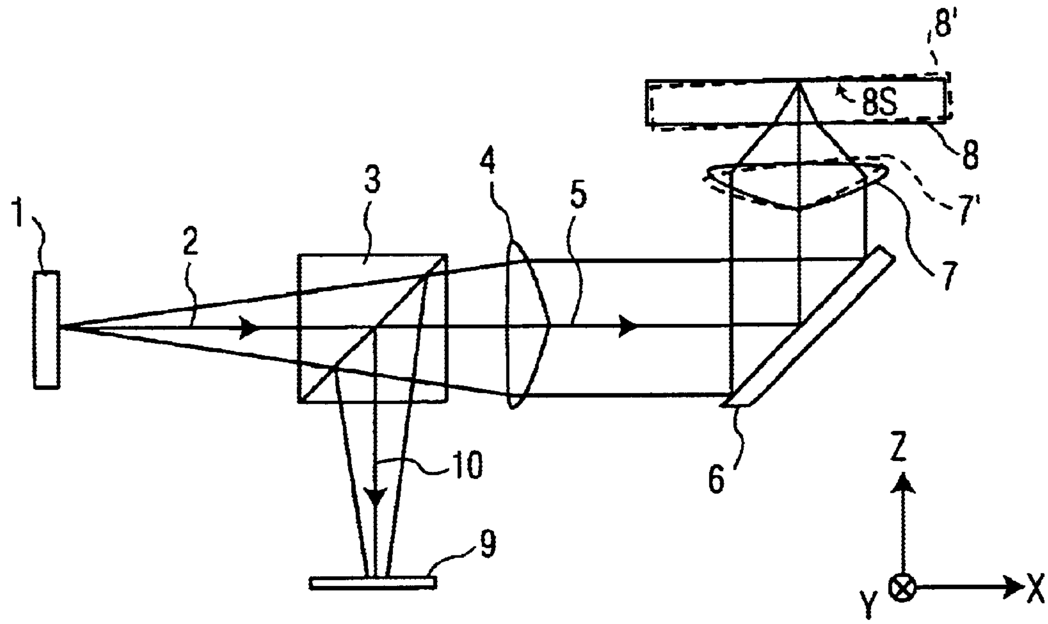
FIG. 1(A) is a conventional cross-sectional configuration figure of an optical head.

7 . . . objective lens
8 . . . optical disk
10 . . . subtracter
A . . . difference signal
11 . . . adder
11S . . . summation signal
B . . . arithmetic signal
20 . . . arithmetic circuit
22, 27 . . . low-pass filter
25, 29 . . . driving circuit
26 . . . tracking drive signal
30 . . . lens tilt drive signal
32, 35 . . . compensation signal
31, 34 . . . amplifier

DETAILED DESCRIPTION OF THE PREFERRED EMBODIMENTS

Figure 1B:
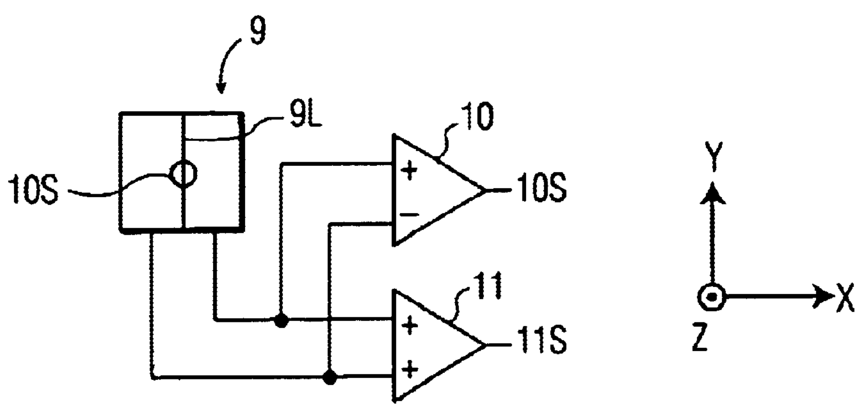
FIG. 1(B) is a conventional typical figure of optical detecting means of the optical head.
Figure 1C:
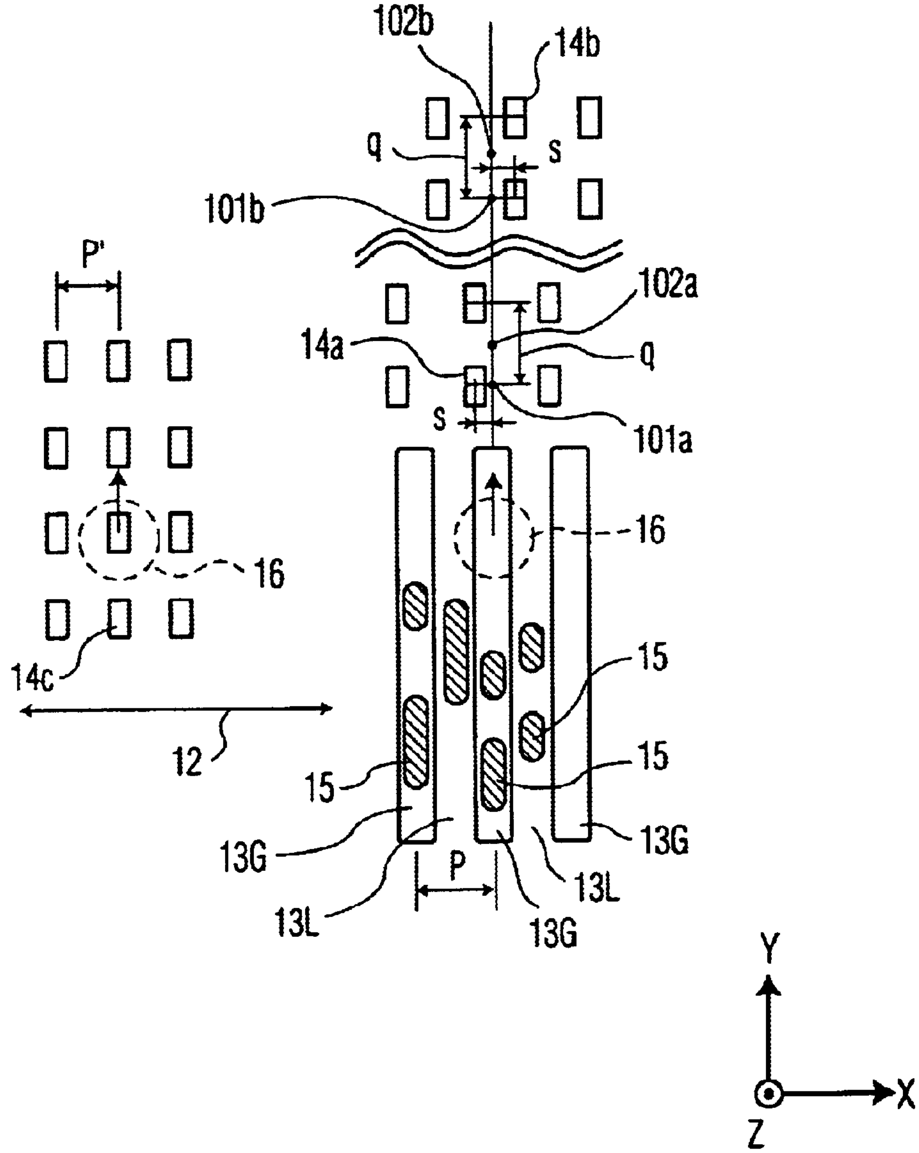
FIG. 1(C) is a conventional partial enlarged view showing grooves and pits formed on an optical disk signal surface, and the position of an optical spot scanning thereon.
Figure 2:
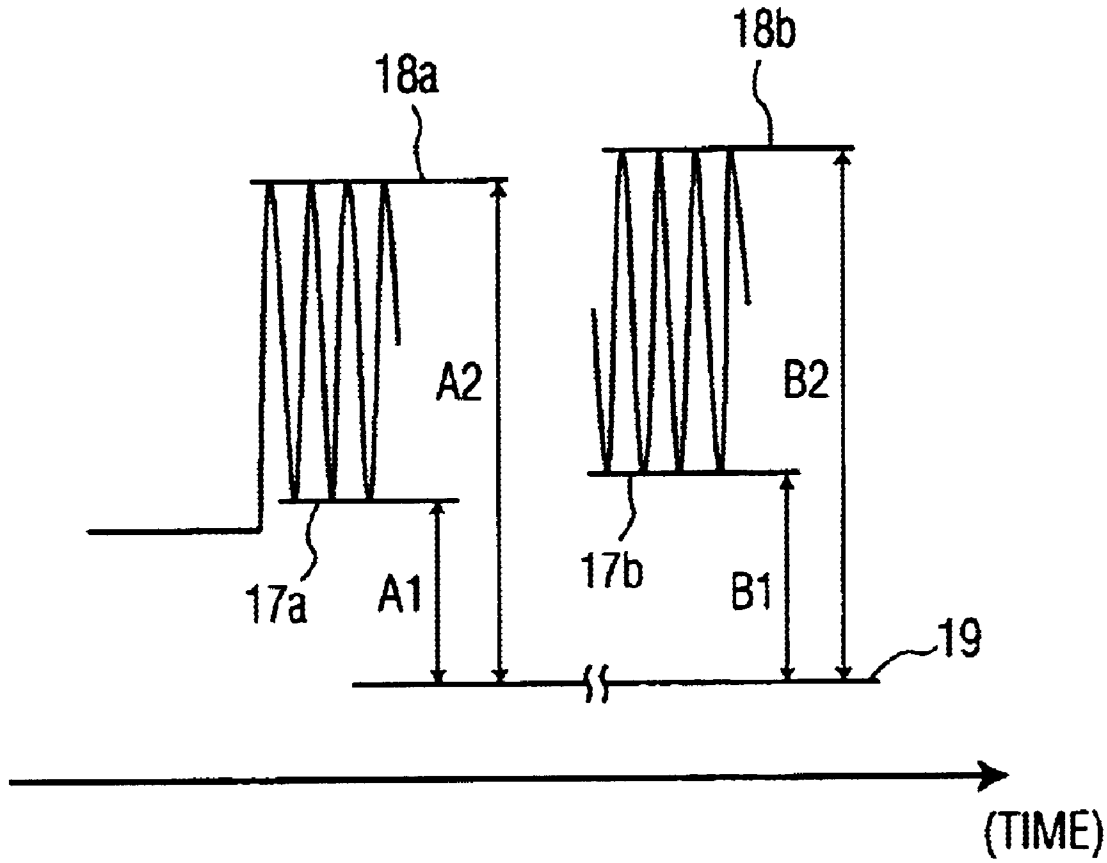
FIG. 2 is a conventional signal waveform figure of a summation signal at the time when the optical spot scans near pit lines 14*a* and 14*b;*

Embodiments of the present invention will be described below on the basis of FIG. 1(A) to FIG. 6. FIG. 1(A) to FIG. 1(C) and FIG. 2 are explanation views common to all of embodiment 1 to embodiment 3 to be described below. FIG. 1 (A) to FIG. 1(C) show the configuration of the cross section of an optical head of the present invention, the state of an optical spot on the optical disk signal surface, or the like, and the description will be omitted since they are similar to those in the case of the previously described conventional example. FIG. 2 shows a signal waveform of a summation signal 11S at the time when an optical spot 16 scans near pit lines 14*a* and 14*b,* and the description will also be omitted since this is similar to that in the case of the above described conventional example.

(Embodiment 1)

The configuration and action of an optical disk device of the present embodiment will be described below while referring to FIG. 3 and FIG. 4, and at the same time, one embodiment of a control method of an optical system of the present invention will also be described. Here, FIG. 3 shows a flow of the control signal process in an optical disk device of the present embodiment 1.

Figure 3:
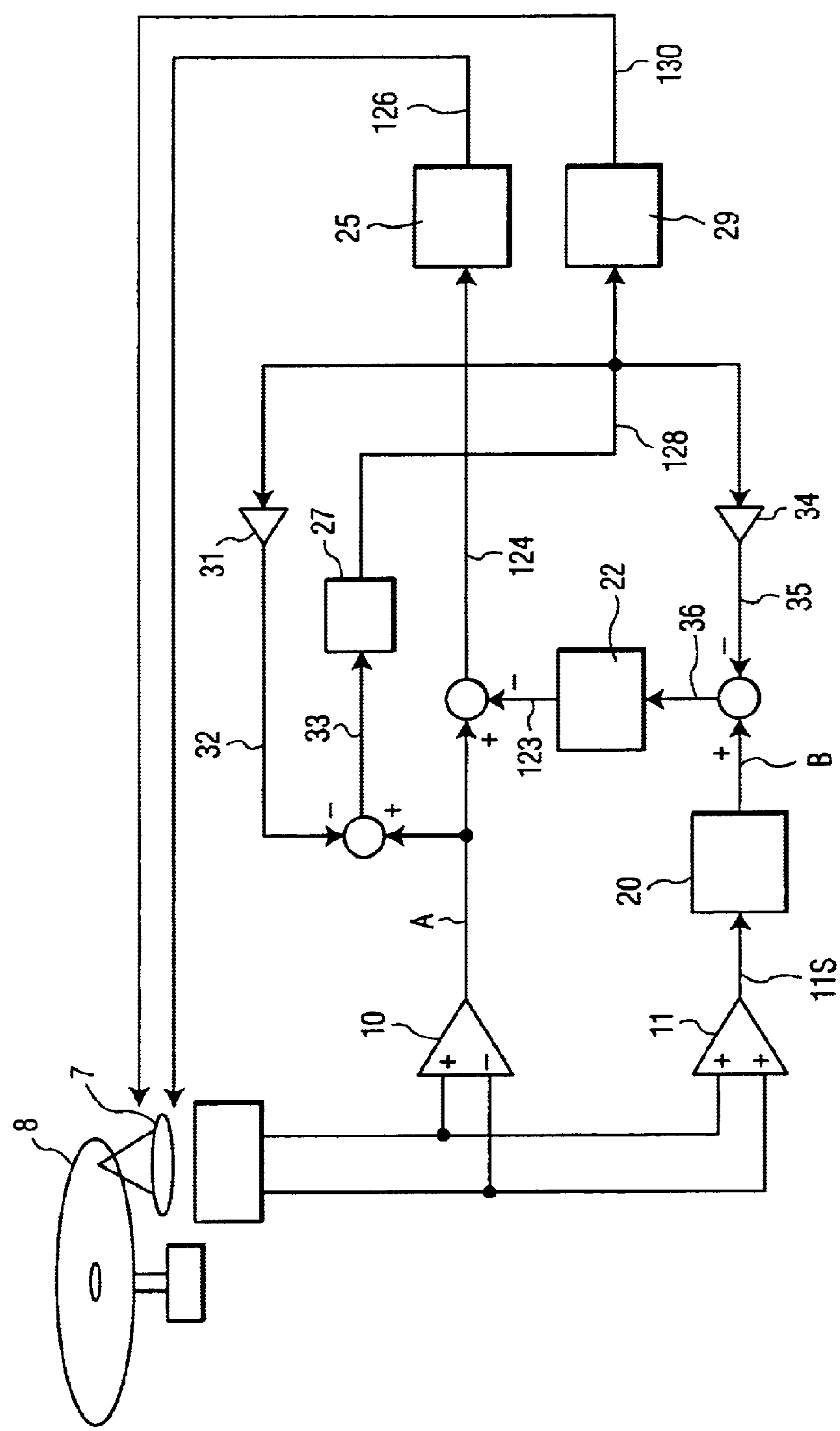
FIG. 3 is an explanation figure showing a flow of the control signal process in an optical disk device of embodiment 1.

First, in FIG. 3, the summation signal 11S created in an adder 11 is a signal at the time when the optical spot 16 scans near the pit lines 14*a* and 14*b,* and it shows a signal waveform shown in FIG. 2. By introducing this signal into an arithmetic circuit 20, a signal B defined by the relation of B=(A2−A1)−(B2−B1) is created, and from the signal B, a compensation signal 35 to be described later is subtracted to create a signal 36, and the high frequencies are cut by a low-pass filter 22, and a signal 123 is made.

On the other hand, a signal A of the difference created in the subtracter 10 is a signal at the time when the optical spot 16 scans on the groove 13G or the inter-groove space 13L. A difference signal 124 of this signal A and the signal 123 is introduced into a driving circuit 25, and a tracking drive signal 126 is created. By this drive signal 126, the objective lens 7 is moved in the radial direction of the optical disk 8, and the tracking center control of the optical spot 16 is performed.

Furthermore, under the condition where this tracking control is applied, a compensation signal 32 to be described later is subtracted from the signal A to create a signal 33, and the high frequencies are cut by a low-pass filter 27, and a signal 128 is made.

Herein, a lens tilt drive signal 130 to be described later is proportional to the above described signal 128, and is a driving current or a driving voltage of an actuator (omitted in the figure) for keeping the tilt angle of the objective lens 7. This driving current is proportional to the tilt quantity from the reference position of the objective lens 7. Accordingly, it can be said that the signal 128 is a signal corresponding to the tilt quantity LT of the lens in the radial direction.

This signal 128 is amplified by β times in an amplifier 31 to be the above described compensation signal 32, and on the other hand, it is amplified by γ times in an amplifier 34 to be the above described compensation signal 35 (determination of the values of coefficients β, γ will be described later). The signal 128 is introduced into a driving circuit 29, and a lens tilt drive signal 130 is created. Then, as mentioned above, by this drive signal 130, the objective lens 7 is tilted in the radial direction of the optical disk 8 (state of the objective lens 7' in FIG. 1(A)), and the lens tilt control is performed.

Here, the description of the action of an optical disk device of the present embodiment using FIG. 3 is once finished, and the reason why the off-track quantity has not been made zero and the third order coma aberration has not been cancelled by the conventional method will be described. Herein, the description of the action of the optical disk device of the present embodiment using FIG. 4 will be given later.

First, the present inventor has thought that the signal A and signal B are functions of an off-track quantity OT (deviation quantity of the position in the radial direction between the light intensity peak point of the optical spot 16 and the center of the groove 13G or the inter-groove space 13L), the disk tilt quantity DT in the radial direction (component in the radial direction of the angle between the normal of the disk surface and the incident optical axis), and the lens tilt quantity LT in the radial direction (component in the radial direction of the angle between the lens center axis and the incident optical axis), and these are approximately given by the following expressions:

$$B=a\cdot OT+b\cdot DT-c\cdot LT \quad \text{(Expression 1)}$$

$$A=a'\cdot OT+b'\cdot DT-c'\cdot LT \quad \text{(Expression 2)}$$

Here, the values of coefficients a, b, c and a', b', c' can theoretically be calculated, but they are different depending on whether the optical spot 16 scans on the groove 13G or on the inter-groove space 13L. Furthermore, the coefficient c or c' is not zero, and it is important in the present invention that the inventor has thought out of this fact.

In the present embodiment, as the values of the respective coefficients, a=214 (1/μm), b=16 (1/deg), c=24 (1/deg), a'=212 (1/μm), b'=36 (1/deg), and c'=40 (1/deg) have been used.

Herein, as for the method for determining the values of the above described coefficients, it is also possible to obtain suitable values by a method in which the configuration of the circuit shown in FIG. 3 is used and the respective coefficients are determined by the trial and error technique.

Furthermore, the condition for canceling the third order coma aberration is given by the following expression using a coefficient k determined by the designing condition of a lens (aspheric surface coefficient or the like).

$$LT=k\cdot DT \quad \text{(Expression 3)}$$

Then, as mentioned above, the control formula of the tracking center in a conventional optical disk is B=0, and the control formula of the lens tilt is A=0, and therefore, when making these relations coexist with (Expression 1) and (Expression 2), the following expressions hold:

$$OT=DT\cdot(b'c-bc')/(ac'-a'c) \quad \text{(Expression 4)}$$

$$LT=DT\cdot(ab'-a'b)/(ac'-a'c) \quad \text{(Expression 5)}$$

In (Expression 4), usually, b'c−bc'=0 is not made, and therefore, such a result that the off-track quantity is zero (OT=0) is not made. Furthermore, in (Expression 5) usually, (ab'−a'b)/(ac'−a'c)=k is not made, and therefore, the third order coma aberration is not cancelled. Thus, it has been understood that the reason why the above describe problems are caused can theoretically be explained by using the above described approximate expressions thought out by the present inventor.

Then, the present inventor has paid attention to LT of the above described approximate expression, which can be estimated by the tilt side driving current or tilt side driving voltage of the movable tilting means, and has thought out of performing the compensation of the control formula using this. That is, the inventor has discovered that the above described problems can be solved by letting the control formula of the tracking center in an optical disk device in the present embodiment 1 be B−γ·LT=0, and letting the control formula of the lens tilt be A−β·LT=0.

Next, the effectiveness of the above described control formulas that are the essential point of the present invention will be described in detail. That is, these control formulas are made to coexist with (Expression 1) and (Expressing 2) (values of the coefficients a, b, c and a', b', c' are equal to those in the above described case), and when solved on the condition that the relations of OT=0 and LT=k·DT are satisfied, the following expressions are determined:

$$\gamma=b/k-c \quad \text{(Expression 6)}$$

$$\beta=b'/k-c' \quad \text{(Expression 7)}$$

Conversely speaking, when (Expression 6) and (Expression 7) hold, even if the disk tilt exists, the relations of OT =0 and LT=k·DT hold, and the off-track quantity is zero (OT=0), and the third order coma aberration is cancelled (LT=k·DT). However, as mentioned above, the values of the coefficients a, b, c and a', b', c' are different depending on whether the optical spot 16 scans on the groove 13G or on the inter-groove space 13L, and therefore, the values of β, γ should also be switched to the respective optimum values depending on the scanning places.

Figure 4:
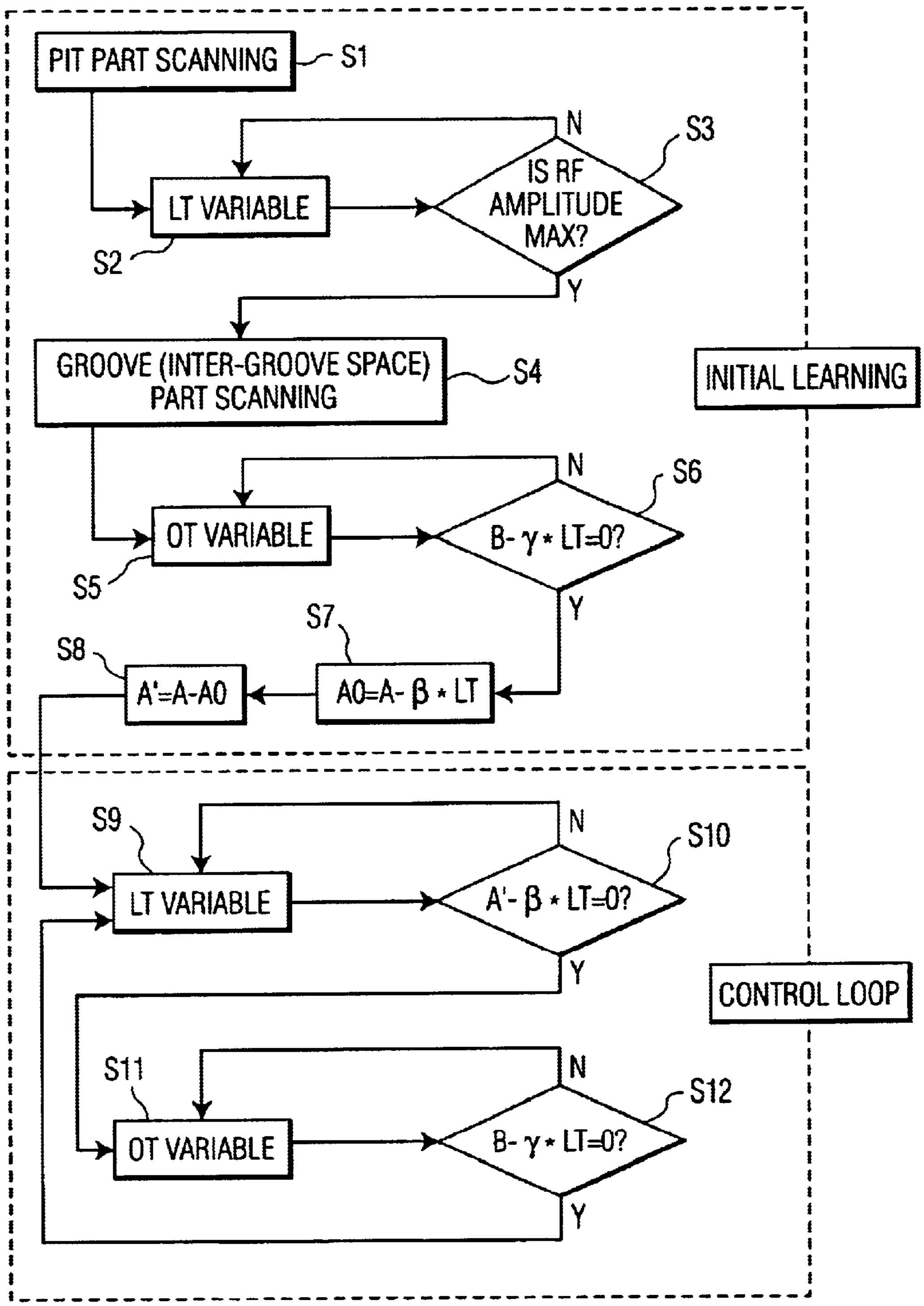
FIG. 4 is an explanation figure showing a flow of the control procedure in the optical disk device of embodiment 1.

Next, by using FIG. 4, the description of the action of the present embodiment 1 will further be performed. FIG. 4 shows a flow of the control procedure in an optical disk device of the present embodiment 1. At the time of initial learning, the optical spot 16 scans on the pit line 14*c* formed in the inner peripheral part of the optical disk, and the lens tilt quantity LT in the radial direction is adjusted so that the signal amplitude thereof (RF amplitude) may be maximum (S1 to S3).

After the adjustment, the optical spot 16 moves to the part of the groove 13G or inter-groove space 13L of the optical disk, and the off-track quantity OT is adjusted so that B−γ·LT =0 may be satisfied while LT is fixed, and the output level (AO+β·LT) of the signal A is read (S4 to S7). Originally, AO is zero, but the signal A is a difference signal, and therefore, it has an offset quantity AO because of the relative positional error of the optical spot 10S and the detector 9, and in order to eliminate this influence, the value A' made by subtracting AO from the signal A is treated as the true value of the signal A (S8).

Next, the action moves to the control loop, and repeats the control process of adjusting LT so that (1) A'−β·LT=0 may be satisfied and of adjusting OT so that (2) B−γ·LT=0 may be satisfied (S9 to S12). By the above described procedure, the influence because of the adjusting error of the detector can be eliminated.

Herein, in the present embodiment, it is possible for the signal B to be a signal defined by the relation of B=A1−B1, and it is also possible to be a signal defined by the relation of B=A2−B2. At these moment, the coefficients a, b, c have values different from those in the present embodiment 1, but similarly to the present embodiment 1, by using new coefficient values and adopting β and γ that makes (Expression 6) and (Expression 7) hold, the off-track quantity can be made zero to cancel the third order coma aberration even when the disk tilt exists.

(Embodiment 2)

In the following, while referring to FIG. 5, the configuration and action of an optical disk device of the present embodiment will be described, and at the same time, one embodiment of a control method of an optical system of the present invention will also be described. Here, FIG. 5 shows a flow of the control signal process in an optical disk device of the present embodiment 2 of the present invention.

Figure 5:
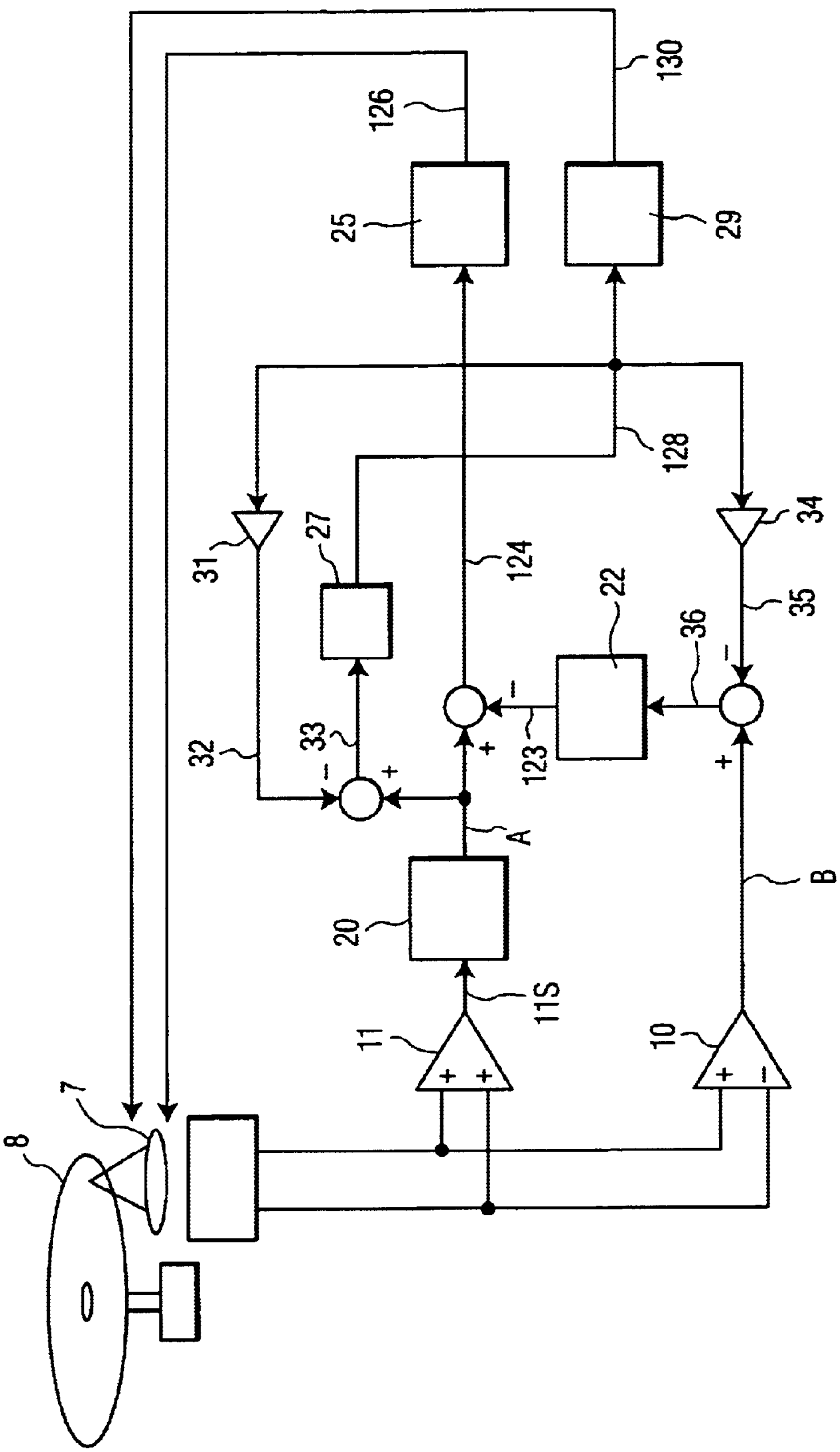
FIG. 5 is an explanation figure showing a flow of the control signal process in an optical disk device of embodiment 2.

In FIG. 5, the difference signal B created in the subtracter 10 is a signal at the time when the optical spot 16 scans on the groove 13G or the inter-groove space 13L. From this signal, a compensation signal 35 to be described later is subtracted to create a signal 36, and the high frequencies are cut by a low-pass filter and a signal 123 is made.

On the other hand, the summation signal 11S created in the adder 11 is a signal at the time when the optical spot 16 scans near the pit lines 14*a* and 14*b,* and it shows a signal waveform shown in FIG. 2. By introducing this signal into the arithmetic circuit 20, the signal A defined by the relation of A=(A2−A1)−(B2−B1) is created, and the difference signal 124 of this signal A and the signal 123 is introduced into a driving circuit 25 to create a tracking drive signal 126. By this drive signal 126, the objective lens 7 is moved in the radial direction of the optical disk 8 to perform the tracking center control of the optical spot 16.

Furthermore, under the condition where this tracking control is applied, a compensation signal 32 to be described later is subtracted from the signal A to create a signal 33, and by a low-pass filter 27, the high frequencies are cut to create a signal 128. The signal 128 is a signal corresponding to the lens tilt quantity LT in the radial direction, and this signal 128 is amplified by β times in an amplifier 31 to be the above described compensation signal 32, and on the other hand, it is amplified by γ times in an amplifier 34 to be the above described compensation signal 35. The signal 128 is introduced into a driving circuit 29 to create a lens tilt drive signal 130. By this drive signal 130, the objective lens 7 is tilted in the radial direction of the optical disk 8 (state of the objective lens 7' in FIG. 1(A)) to perform the lens tilt control.

The control formula of the tracking center in the present embodiment 2 is B−γ·LT=0, and the control formula of the lens tilt is A−β·LT=0, and therefore, when these relations are made to coexist with (Expression 1) and (Expression 2) (values of the coefficients a, b, c and a', b', c' are different from those in the embodiment 1) and they are solved under the condition where the relations of OT=0 and LT=k·DT are satisfied, (Expression 6) and (Expression 7) are determined. Accordingly, similarly to embodiment 1, by adopting β and γ that can make (Expression 6) and (Expression 7) hold, the off-track quantity can be made zero to cancel the third order coma aberration even when the disk tilt exists. As mentioned above, the values of the coefficients a, b, c and a', b', c' are different depending on whether the optical spot 16 scans on the groove 13G or scans on the inter-groove space 13L, and therefore, it is necessary to switch the values of β and γ to the respective optimum values depending on the scanning places.

Herein, in the present embodiment 2, the signal A may be a signal defined by the relation of A=A1−B1, and it may also be a signal defined by the relation of A=A2−B2. At these moments, the coefficients a', b', c' have values different from those in the present embodiment 2, but similarly to the present embodiment 2, by using new coefficient values and adopting and y that makes (Expression 6) and (Expression 7) hold, the off-track quantity can be made zero to cancel the third order coma aberration even when the disk tilt exists.

(Embodiment 3)

Figure 6:
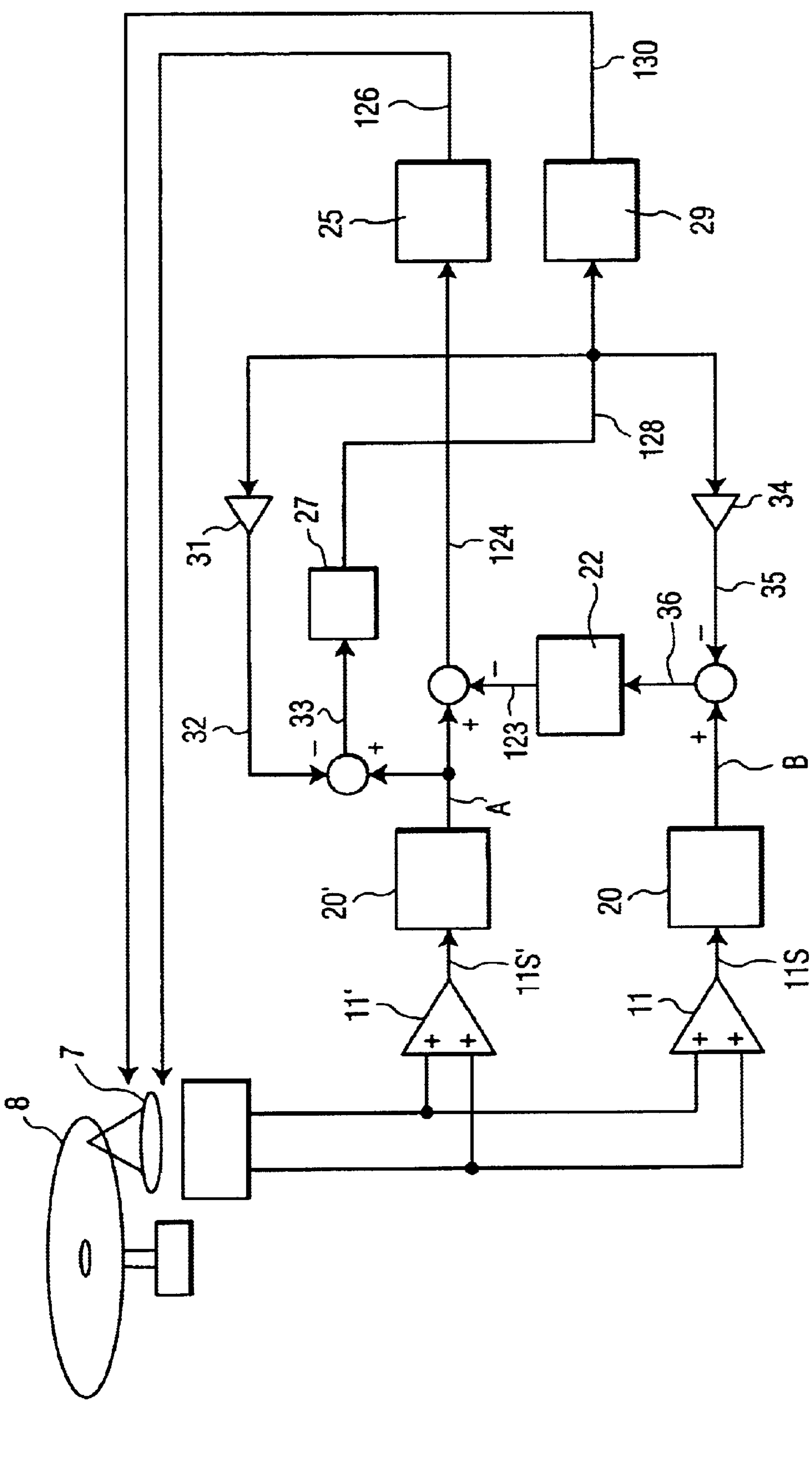
FIG. 6 is an explanation figure showing a flow of the control signal process in an optical disk device of embodiment 3.
Figure 7:
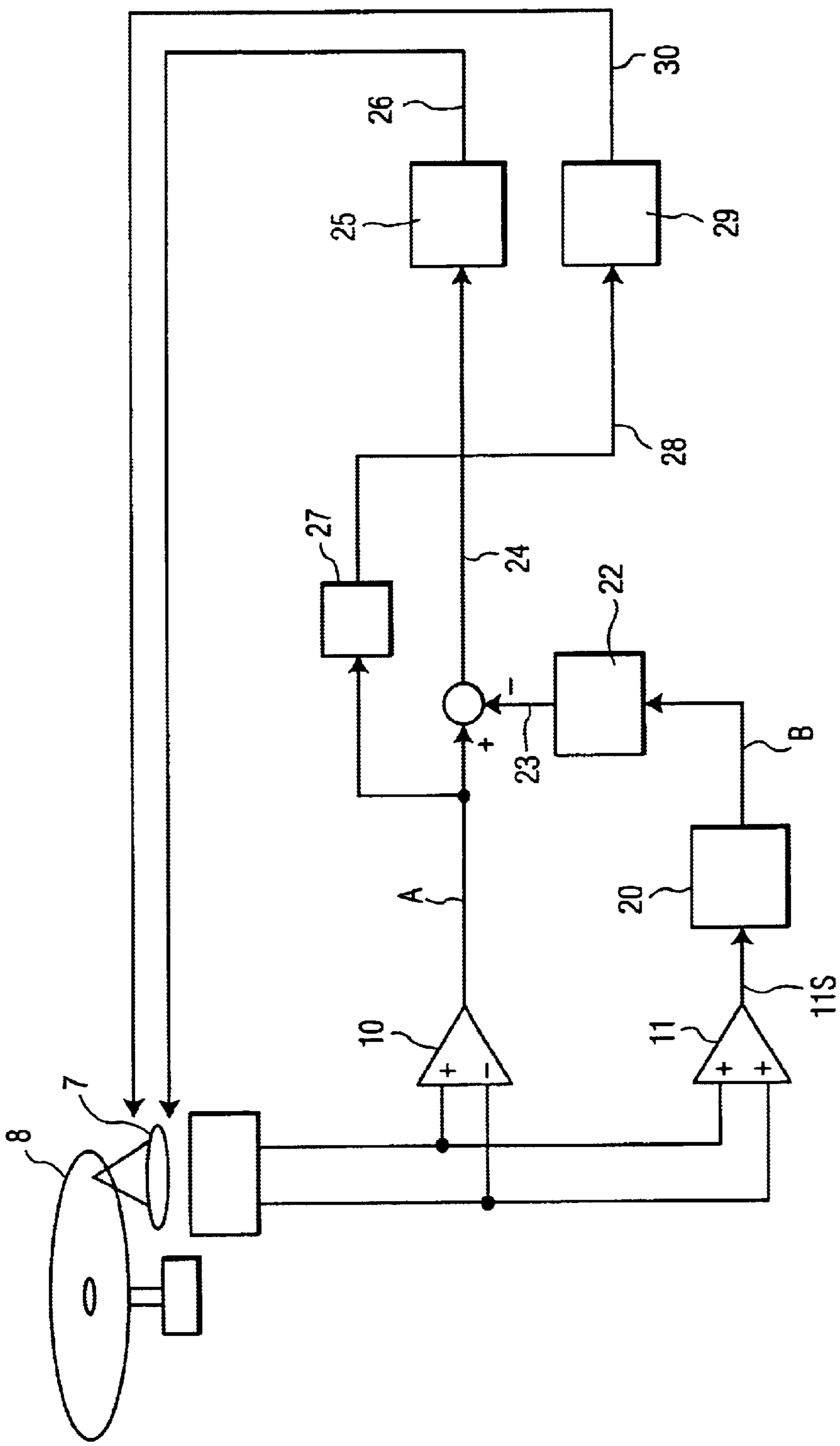
FIG. 7 is an explanation figure showing a flow of the control signal process in an optical disk device of a conventional example.

In the following, while referring to FIG. 6, the configuration and action of an optical disk device of the present embodiment will be described, and at the same time, one embodiment of a control method of an optical system of the present invention will also be described. Here, FIG. 6 shows a flow of the control signal process in an optical disk device of the present embodiment 3. In FIG. 6, the summation signal 11S created in the adder 11 is a signal at the time when the optical spot 16 scans near the pit lines 14*a* and 14*b,* and it shows a signal waveform shown in FIG. 2. By introducing this signal into the arithmetic circuit 20, the signal B defined by the relation of B=(A2−A1)−(B2−B1) is created, and from this signal, a compensation signal 35 to be described later is subtracted to create a signal 36, and by a low-pass filter 22, the high frequencies are cut to create a signal 123.

On the other hand, the summation signal 11S' created in the adder 11' is also a signal at the time when the optical spot 16 scans near the pit lines 14*a* and 14*b,* and it shows a signal waveform shown in FIG. 2. By introducing this signal into the arithmetic circuit 20', the signal A defined by the relation of A=A1−B1 is created, and the difference signal 124 of this signal A and the signal 123 is introduced into the driving circuit 25, and the tracking drive signal 126 is created. By this drive signal 126, the objective lens 7 is moved in the radial direction of the optical disk 8, and the tracking center control of the optical spot 16 is performed.

Furthermore, under the condition where this tracking control is applied, a compensation signal 32 to be described later is subtracted from the signal A to create a signal 33, and by the low-pass filter 27, the high frequencies are cut to create a signal 128. The signal 128 is a signal corresponding to the lens tilt quantity LT in the radial direction, and this signal 128 is amplified by β times in the amplifier 31 to be the above described compensation signal 32, and on the other hand, it is amplified by γ times in the amplifier 34 to be the above described compensation signal 35. The signal 128 is introduced into the driving circuit 29 and the lens tilt drive signal 130 is created. By this drive signal 130, the objective lens 7 is tilted in the radial direction of the optical disk 8 (state of the objective lens 7' in FIG. 1(A)), and the lens tilt control is performed.

The control formula of the tracking center in the present embodiment 3 is B−γ·LT=0, and the control formula of the lens tilt is A−β·LT=0, and therefore, when these relations are made to coexist with (Expression 1) and (Expression 2)

(values of the coefficients a, b, c and a', b', c' are different from those in the embodiment 1) and they are solved under the condition where the relations of OT=0 and LT=k·DT are satisfied, (Expression 6) and (Expression 7) are determined. Accordingly, similarly to embodiment 1, by adopting β and γ that can make (Expression 6) and (Expression 7) hold, the off-track quantity can be made zero to cancel the third order coma aberration even when the disk tilt exists. As mentioned above, the values of the coefficients a, b, c and a', b', c' are different depending on whether the optical spot 16 scans on the groove 13G or scans on the inter-groove space 13L, and therefore, it is also necessary to switch the values of β and γ to the respective optimum values depending on the scanning places.

Herein, in the present embodiment 3, the signal A may be a signal defined by the relation of A=(A2−A1)−(B2 −B1), and it may also be a signal defined by the relation of A=A2−B2.

Furthermore, the signal B may be a signal defined by the relation of B=A2−B2, and it may also be a signal defined by the relation of B=A1−B1. At these moments, the coefficients a, b, c and a', b', c' have values different from those in the present embodiment 3, but similarly to the present embodiment 3, by using new coefficient values and adopting β and γ that can make (Expression 6) and (Expression 7) hold, the off-track quantity can be made zero to cancel the third order coma aberration even when the disk tilt exists.

Herein, the objective lens 7 in embodiments 1, 2, 3 corresponds to the optical condensing means of the present invention.

Furthermore, the part including the objective lens 7 in embodiments 1, 2, 3 corresponds to the optical system of the present invention.

Furthermore, the part including the driving circuit 25 and driving circuit 29 in embodiments 1, 2, 3 corresponds to the control means of the present invention.

Furthermore, the part including the driving circuit 25 and driving circuit 29 in embodiments 1, 2, 3 corresponds to the movable tilting means of the present invention.

Furthermore, in the case where the signal mark 15 is formed on the groove 13G and the inter-groove space 13L, one pit can be used for the groove and the inter-groove space when making s=P/4. Furthermore, it is also possible that the signal mark 15 is formed only on the groove 13G (or on the inter-groove space 13L), and at this moment, when making s=P/2, one pit can be used for the adjacent grooves (or for the adjacent inter-groove spaces).

Furthermore, there is a method other than the beam splitter for branching the returning light, and this may be the hologram or polarization hologram, and the mounting position thereof may be a space between the objective lens 7 and the reflecting mirror 6, or a space between the reflecting mirror 6 and the collimate lens 4.

Furthermore, it is unnecessary to perform the control in the present invention by using only the tilt quantity of the optical system like that in the above described embodiment, and it may be performed by using the off-track quantity and/or the tilt quantity of the optical system. However, in the case where the off-track quantity is used, it is sufficient to have means for directly measuring the off-track quantity, or for indirectly calculating that from the tracking drive current or the like.

Furthermore, in the present invention, to use the off-track quantity and/or the tilt quantity of the optical condensing means is, as mentioned above, for example, as shown in FIG. 3, to perform the control for satisfying the control formula (A−β·LT=0) by multiplying the value of the lens tilt quantity LT in the radial direction by β times and feeding back that to the signal A as the tilt quantity of the optical condensing means. Furthermore, in the case of FIG. 3, similarly to this, by multiplying the lens tilt quantity LT in the radial direction by γ times and feeding back that to the signal B as the tilt quantity of the optical condensing means, the control for satisfying the control formula (B−γ·LT=0) is also together performed. Furthermore, for example, in the cases of the configurations shown in FIG. 5 and FIG. 6, the control similar to that in the above description is also performed, which is mentioned above.

Furthermore, in the control in the present invention, it is unnecessary to perform both the tracking control and the tilt control of the optical system similar to that in the above described embodiment, and it is also possible to perform only either of these. That is, in the above described embodiment, the description has been given as for the case where the tilt quantity of the optical system of the present invention is used as the compensation quantity in both controls of the tracking control and the tilt control of the optical system, but it is not limited to this, and for example, it is also possible to use the tilt quantity of the optical system only for either control as the compensation quantity. In that case, for the other control, it is sufficient to perform a control similar to the conventional one. Furthermore, in the case where the off-track quantity is used as the compensation quantity, the fact similar to the above description can be said.

Furthermore, it is possible to realize the function of each component of an optical disk device of the present invention with a special hardware, and it is also possible to realize that in the manner of software by using a computer program.

Furthermore, it is possible to execute an action similar to that in the above description by preparing and utilizing a program recording medium such as an optical disk or a magneto-optical disk, wherein programs for executing all or part of actions of all or part of steps of each of the above described embodiments by a computer are recorded.

An optical disk device of the present invention presents, for example, the following effect. That is, it is an optical disk device comprising a radiating light source, an objective lens, optical distributing means, and optical detecting means, in which the light emitted from the radiating light source passes through the optical distributing means and is condensed on a signal surface formed on the rear surface of a base material of an optical disk by the objective lens, and the returning light reflected on this and condensed by the objective lens advances in a direction different from that on the approach route side by the optical distributing means and is condensed on the optical detecting means so that the light quantity may be detected, wherein the objective lens can be moved and tilted in the radial direction of the optical disk by a movable tilting means supporting this, and cyclic grooves and cyclic pits are formed on the signal surface of the optical disk, and the signals A−β·LT and B−γ·LT made by compensating two types of signals A and B detected when the optical spot condensed on the signal surface scans near the cyclic grooves or the cyclic pits with the quantities β·LT and γ·LT proportional to the tilt quantity LT of the objective lens are made to be the tilt control signal of the movable tilting means and the tracking control signal (that is, the alignment control signal to the cyclic grooves or cyclic inter-groove spaces) respectively, and the control is performed so that each signal may be zero.

Herein, the cyclic grooves and the cyclic pits are formed along the radial direction of the optical disk by a pitch P, and in the cyclic pits, there are cyclic pits (cyclic pits a) whose positions are shifted to the inner peripheral side by s along the radial direction from the cyclic groove positions and are also arranged in cycles in the rotational direction of the optical disk, and cyclic pits (cyclic pits b) whose positions are shifted inversely to the peripheral side by s and are also arranged in cycles in the rotational direction of the optical disk, and the optical spot scans on the cyclic grooves or the cyclic inter-groove spaces. The tilt quantity LT of the objective lens is estimated by the tilt side driving current or the tilt side driving voltage of the movable tilting means, and the set values of the coefficients β and γ are changed depending on whether the optical spot scans on the cyclic grooves or on the cyclic inter-groove spaces.

In the case where the optical detecting means is divided into two by a straight line corresponding to the rotational direction of the optical disk, a difference signal can be detected from these divided areas, and either the signal A or signal B can be a difference signal at the time when the optical spot scans on the cyclic grooves or the cyclic inter-groove spaces. Furthermore, when between the signal waveforms detected by the optical detecting means at the time when the optical spot scans near the cyclic pits a, the detection level of an envelope drawn by a signal waveform having a smaller detected light quantity is A1 and the detection level of an envelope drawn by a signal waveform having a larger detected light quantity is A2, and between the signal waveforms detected by the optical detecting means at the time when the optical spot scans near the cyclic pits b, the detection level of an envelope drawn by a waveform having a smaller detected light quantity is B1, and the detection level of an envelope drawn by a waveform having a larger detected light quantity is B2, the signals A, B may be any one of A1–B1, A2–B2, and (A2 –A1)–(B2–B1).

Furthermore, in the case where the signal A is a difference signal, pits along the rotational direction of the optical disk are formed on the inner peripheral side of the optical disk, and the objective lens is tilted so that the detected signal amplitude at the time when the optical spot scans on these pits may be maximum, and moving to the groove part (or the inter-groove space part) while keeping this tilt, the output level (AO+β·LT) of the signal A at the time when b −γ·LT=0 is made is recorded, and after that, the signal A is replaced by (A−AO) and the control is performed. Herein, reference symbol AO denotes the offset quantity because of the relative positional error of the optical spot 10S and the detector 9.

According to the above described configuration, the tilt to the optical axis of the objective lens converging as a result of the control agrees with the tilting direction of the base material of the optical disk, and by each tilt, the third order coma aberration component of the optical spot on the signal surface is approximately cancelled by setting of the coefficient β. Furthermore, the alignment error to the cyclic grooves (or the cyclic inter-groove spaces) of the optical spot converging as a result of the control can be made approximately zero by setting of the coefficient γ.

Herein, concretely, if the tilt to the optical axis of the objective lens converging as a result of the control agrees with the tilting direction of the base material of the optical disk and by each tilt, the third order coma aberration component of the optical spot on the signal surface is suppressed to an aberration quantity of 1/10 or less by setting of the coefficient β, the shortage of power at the time of recording, the degradation of the jitter at the time of reproduction, or the like is not a substantial problem.

Furthermore, concretely, if the alignment error to the cyclic grooves (or the cyclic inter-groove spaces) of the optical spot converging as a result of the control is suppressed to 1/20 or less of the wavelength of the light source by setting of the coefficient γ, the partial elimination by the optical spot 16 of the adjacent signal marks at the time of recording, the increase of the cross-talk at the time of reproduction, the degradation of the jitter, or the like is not a substantial problem.

According to the above described present invention, for example, the tilt of the objective lens can accurately be controlled to have an angle at which the third order coma aberration can be cancelled even when there is a tilt in the optical disk, and in addition to that, the off-track quantity of the optical spot on the signal surface can be made zero. Accordingly, it is possible to solve the various problems created in the case where there is a tilt in the optical disk (elimination of the adjacent signal marks at the time of recording, degradation of the jitter because of the increasing of the cross-talk at the time of reproduction, or the like) and therefore, there is a large effect in realizing recording and reproduction of a signal with a high density.

Herein, the tilt of the objective lens in the present invention may be a relative tilt to the optical disk.

Herein, the present invention is a medium that holds a program and/or data for executing all or part of the functions of all or part of the above described means of the present invention by a computer, wherein the reading by a computer is possible, and the above described read program and/or data executes the above described functions working together with the above described computer.

Furthermore, the present invention is a medium that holds a program and/or data for executing all or part of the actions of all or part of the above described steps of the present invention by a computer, wherein the reading by a computer is possible, and the above described read program and/or data executes the above described actions working together with the above described computer.

Furthermore, the present invention is an information aggregate that is a program and/or data for executing all or part of the functions (or actions) of all or part of the above described means (or steps) of the present invention by a computer, wherein the reading by a computer is possible, and the above described read program and/or data executes the above described functions (or actions) working together with the above described computer.

Furthermore, the above described data includes the data structure, data format, types of data, or the like.

Furthermore, the above described medium includes a recording medium such as a ROM, a transmitting medium such as the internet, and a transmitting medium such as light, radio-wave, or sound-wave.

Furthermore, the above described holding medium includes, for example, a recording medium for recording a program and/or data, a transmitting medium for transmitting a program and/or data, or the like.

Furthermore, the possibility of being processed by a computer is, for example, the possibility of being read by a computer in the case of a recording medium such as a ROM, and it includes the fact that a program and/or data to be the object of transmission can be treated by a computer, as a result of the transmission in the case of a transmitting medium.

Furthermore, the above described information aggregate includes, for example, a software such as a program and/or data.

It is clear from the above description that the present invention has such an advantage that the off-track quantity or the occurrence of the third order coma aberration can be suppressed to a smaller one when compared with that of the prior art.

What is claimed is:

1. An optical disk device comprising:

optical condensing means for condensing radiated light from a light source on an optical disk;

optical detecting means for detecting reflected light from said optical disk; and control means for performing tracking control and/or tilt control of said optical condensing means by using an off-track quantity and/or a tilt quantity of said optical condensing means, wherein said control means amplifies the tilt quantity by a factor β and a factor γ to form, respectively, β*tilt and γ*tilt, and combines β*tilt and a first signal to form the tilt quantity, and combines γ*tilt and a second signal to form the off-track quantity.

2. An optical disk device comprising:

a radiating light source for performing radiation of radiated light;

an objective lens for condensing said radiated light on a signal surface of an optical disk as an optical spot, and for condensing returning light from said optical disk;

movable tilting means for controlling movement of said objective lens in the radial direction of said optical disk, and tilt in said radial direction of said objective lens; and optical detecting means for detecting a light quantity of said returning light, wherein a signal A and a signal B that are detected when said optical spot scans near cyclic grooves or cyclic pits formed on a signal surface of said optical disk are compensated by using quantities β*LT and γ*LT proportional to a tilt quantity LT of said objective lens to be a compensated signal (A−β*LT) and a compensated signal (B−γ*LT), where β and γ are each amplification factors, and letting said compensated signal (A−β*LT) be a tilt control signal for controlling tilt of said objective lens, and letting said compensated signal (B−γ*LT) be a tracking control signal for controlling an alignment to said cyclic grooves or said cyclic inter-groove spaces of said optical spot, said movable tilting means controls said movement of said objective lens and said tilt of said objective lens so that said tilt control signal and said tracking control signal may substantially be zero.

3. The optical disk device according to claim 2, further comprising optical distributing means for distributing said radiated light and said returning light, wherein said returning light is bent in a direction different from that on the approach route side of said radiated light by said optical distributing means and condensed on said optical detecting means.

4. The optical disk device according to claim 2 or 3, wherein said cyclic grooves and said cyclic pits are formed along the radial direction of said optical disk by a pitch P, and in said cyclic pits, there are cyclic pits a arranged such that the positions thereof are shifted to the inner peripheral side along the radial direction from the positions of cyclic grooves by s in cycles in the rotational direction of the optical disk, and cyclic pits b arranged to be inversely shifted to the outer peripheral side by s in cycles in the rotational direction of said optical disk, and said optical spot scans on said cyclic grooves or on said cyclic inter-groove spaces.

5. The optical disk device according to claim 4, wherein a positional shift s of said cyclic pits is equal to P/4 or P/2.

6. The optical disk device according to any one of claims 2 or 3, wherein a tilt quantity LT of said objective lens is estimated by using driving current on the tilt side of said movable tilting means or driving voltage on the tilt side of said movable tilting means.

7. The optical disk device according to any one of claims 2 or 3, wherein set values of said coefficient β and said coefficient γ are changed depending on whether said optical spot scans on said cyclic grooves or on said cyclic inter-groove spaces.

8. The optical disk device according to any one of claims 2 or 3, wherein tilt to an optical axis of said objective lens converging as a result of control agrees with the tilting direction of a base plate of said optical disk, and a third order coma aberration component of an optical spot on said signal surface is substantially suppressed by setting of said coefficient β with each tilt.

9. The optical disk device according to any one of claims 2 or 3, wherein an alignment error to cyclic grooves or cyclic inter-groove spaces of said optical spot converging as a result of control is substantially suppressed by setting of said coefficient γ.

10. The optical disk device according to claims 2 or 3, wherein said optical detecting means is divided into two by a straight line corresponding to the rotational direction of said optical disk, and can detect a difference signal from the divided areas, and either said signal A or said signal B is said difference signal at the time when said optical spot scans on said cyclic grooves or said cyclic inter-groove spaces.

11. The optical disk device according to any one of claims 4 or 5, wherein when letting a detecting level of an envelope drawn by a side with a smaller detected light quantity be A1, and a detecting level of an envelope drawn by a side with a larger detected light quantity be A2 between detected signal waveforms by said optical detecting means when said optical spot scans near said cyclic pits a, and letting a detecting level of an envelope drawn by a side with a smaller detected light quantity be B1, and a detecting level of an envelope drawn by a side with a larger detected light quantity be B2 between detected signal waveforms by said optical detecting means when said optical spot scans near said cyclic pits b, said signal A is expressed by an one of A=A1−B1, A=A2−B2, and A=(A2−A1)−(B2−B1).

12. The optical disk device according to any one of claims 2 or 3, wherein when letting a detecting level of an envelope drawn by a side with a smaller detected light quantity be A1, and a detecting level of an envelope drawn by a side with a larger detected light quantity be A2 between detected signal waveforms by said optical detecting means when said optical spot scans near said cyclic pits a, and letting a detecting level of an envelope drawn by a side with a smaller detected light quantity be B1, and a detecting level of an envelope drawn by a side with a larger detected light quantity be B2 between detected signal waveforms by said optical detecting means when said optical spot scans near said cyclic pits b, said signal B is expressed by an one of B=A1−B1, B=A2−B2, and B=(A2−A1)−(B2−B1).

13. The optical disk device according to claim 10, wherein said signal A is said difference signal, and a pit along the rotational direction of said optical disk is formed on the inner peripheral side of said optical disk, and said movable tilting means tilts said objective lens so that a detected signal amplitude at the time when said optical spot scans on said pit may be maximum, and moves said optical spot onto said cyclic grooves or said cyclic inter-groove spaces while keeping tilt of said objective lens, and detects an output level of said signal A when said compensated signal (B−γ*LT) becomes zero, and uses a value made by subtracting an offset quantity because of an adjusting error from an output level of said detected signal A, instead of said signal A.

14. A medium that carries a program and/or data for executing by a computer all or part of functions of all or part of means of the present invention according to any one of claims 1 to 3, wherein said medium can be processed by a computer.

15. An information aggregate that is a program an/or data for executing by a computer all or part of functions of all or part of means of the present invention according to any one of claims 1 to 3.

16. A control method of an optical system, comprising the steps of:

condensing radiated light from a light source on an optical information recording medium by using a given optical system;

detecting reflected light from said optical information recording medium; and performing tracking control and/or tilting control of said optical system on the basis of said detected light, by using an off-track quantity and/or a tilt quantity of said optical system, wherein said control means amplifies the tilt quantity by a factor B and a factor γ to form, respectively, β*tilt and γ*tilt, and combines β*tilt and a first signal to form the tilt quantity, and combines γ*tilt and a second signal to form the off-track quantity.

17. A medium that carries a program and/or data for executing by a computer all or part of actions of all or part of steps of the present invention according to claim 16 wherein said medium can be processed by a computer.

18. An information aggregate that is a program an/or data for executing by a computer all or part of actions of all or part of steps of the present invention according to claim 16.

19. A method for controlling an optical disk using a lens tilt (LT) drive controlled by an LT signal and an off-track (OT) drive controlled by an OT signal comprising the steps of:

(a) detecting reflected light from the optical disk;

(b) providing a difference signal and a summation signal in response to the light detected in step (a);

(c) amplifying the LT signal by a factor β and a factor γ to form a first compensation signal of β*LT and a second compensation signal of γ*LT;

(d) combining the first compensation signal of β*LT and the difference signal to form the LT signal; and (e) combining the second compensation signal of γ*LT, the summation signal and the difference signal to form the OT signal.

20. The method of claim 19, further comprising the steps of:

(g) filtering the signals combined in step(d) prior to forming the LT signal; and (h) filtering the second compensation signal and the summation signal in step (e) prior to forming the OT signal.

21. The method of claim 19 wherein the combining in step (d) includes subtracting the first compensation signal from the difference signal to form the LT signal.

22. The method of claim 19 wherein the combining in step (e) includes subtracting the second compensation signal from the summation signal to from an intermediate signal, and subtracting the intermediate signal from the difference signal to form the OT signal.

* * * * *

UNITED STATES PATENT AND TRADEMARK OFFICE

CERTIFICATE OF CORRECTION

PATENT NO. : 6,704,254 B1

DATED : March 9, 2004

INVENTOR(S) : Nishiwaki et al.

It is certified that error appears in the above-identified patent and that said Letters Patent is hereby corrected as shown below:

Column 16,
Line 36, "4 or 5" should read -- 2 or 3 --

Column 17,
Line 37, "by a factor B" should read -- by a factor β --

Column 18,
Line 5, "an/or" should read -- and/or --.

Signed and Sealed this

Third Day of August, 2004

JON W. DUDAS

*Acting Director of the United States Patent and Trademark Office*